US012808970B2

(12) United States Patent
Lee et al.

(10) Patent No.: US 12,808,970 B2
(45) Date of Patent: Nov. 24, 2026

(54) ACOUSTIC WAVE DIRECTION DETECTION UTILIZING A SINGLE MICROPHONE

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 739 days.

(21) Appl. No.: 18/166,453

(22) Filed: Feb. 8, 2023

(65) Prior Publication Data

US 2024/0264261 A1 Aug. 8, 2024

(51) Int. Cl.
*G01S 3/805* (2006.01)
*H04R 1/34* (2006.01)

(52) U.S. Cl.
CPC ............ *G01S 3/8055* (2013.01); *H04R 1/342* (2013.01)

(58) Field of Classification Search
CPC ........ G01S 3/8055; G01S 3/801; G01S 3/802; H04R 1/08; H04R 1/083; H04R 1/2807; H04R 1/342; H04R 1/406; H04R 2430/21; H04R 3/005; G10K 11/16
USPC ....... 381/122, 161, 353, 356, 360, 365, 369, 381/92, 95
See application file for complete search history.

(56) References Cited

U.S. PATENT DOCUMENTS

| | | | | |
|---|---|---|---|---|
| 3,905,235 | A * | 9/1975 | Shaw | G01P 3/44 73/504.01 |
| 4,155,649 | A * | 5/1979 | Leiboff | G01B 11/26 342/443 |
| 7,277,053 | B2 * | 10/2007 | Riel | G01S 3/42 250/233 |
| 7,350,618 | B2 * | 4/2008 | Goh | H04R 1/2842 181/197 |
| 8,126,183 | B2 * | 2/2012 | Enstad | H04N 7/142 381/95 |

(Continued)

OTHER PUBLICATIONS

Fedotov et al., "Influence of a split double concentric ring resonator elements axial rotation on the microwave transmission line frequency-selective characteristics", AIP Advances 11, 035209, 2021 (6 pages).

(Continued)

*Primary Examiner* — Jeremy A Luks
(74) *Attorney, Agent, or Firm* — Christopher G. Darrow; Darrow Mustafa PC

(57) ABSTRACT

The direction of an acoustic wave can be determined using a single microphone. The single microphone can be operatively positioned within an interior of a resonator. The resonator can include a body that includes an aperture, such as a slit, which allows communication between the interior and an exterior of the resonator. The resonator can be configured to rotate. The single microphone can be configured to acquire sound data of an incident acoustic wave. One or more processors can be operatively connected to the single microphone. The one or more processors can be configured to determine a direction of the incident acoustic wave based on the acquired sound data.

20 Claims, 12 Drawing Sheets

(56) References Cited

U.S. PATENT DOCUMENTS

| | | | | |
|---|---|---|---|---|
| 10,873,808 | B2 * | 12/2020 | Kang | H04R 1/406 |
| 11,153,681 | B2 * | 10/2021 | Lee | H04R 1/406 |

OTHER PUBLICATIONS

Lee et al., "Fano-Like Acoustic Resonance for Subwavelength Directional Sensing: 0-360 Degree Measurement", Advanced Science, 2020, 7, 1903101, 2020 (9 pages).
Hokmabadi et al., "Plasmon-Induced Transparency by Hybridizing Concentric-Twisted Double Split Ring Resonators", Scientific Reports 5, 15735; doi: 10.1038/ srep 15735, 2015 (11 pages).
Lee et al., "Acoustic resonance coupling for directional wave control: from angle-dependent absorption to asymmetric transmission", New Journal of Physics 21 (2019) 043030 (12 pages).

* cited by examiner

FIG. 2A
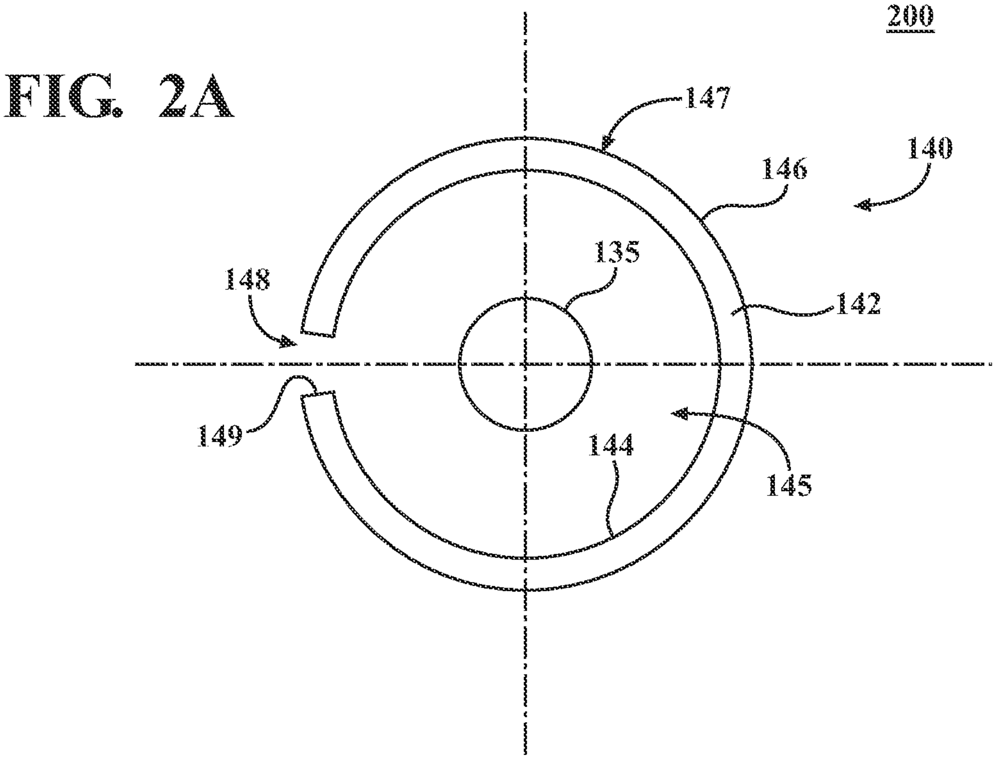
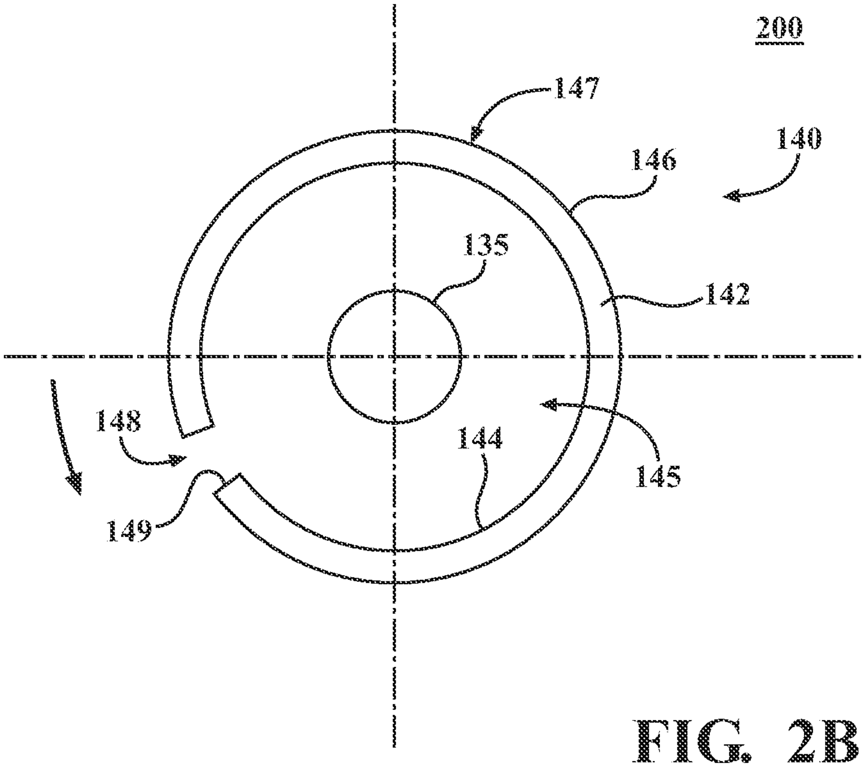
FIG. 2B

FIG. 3A
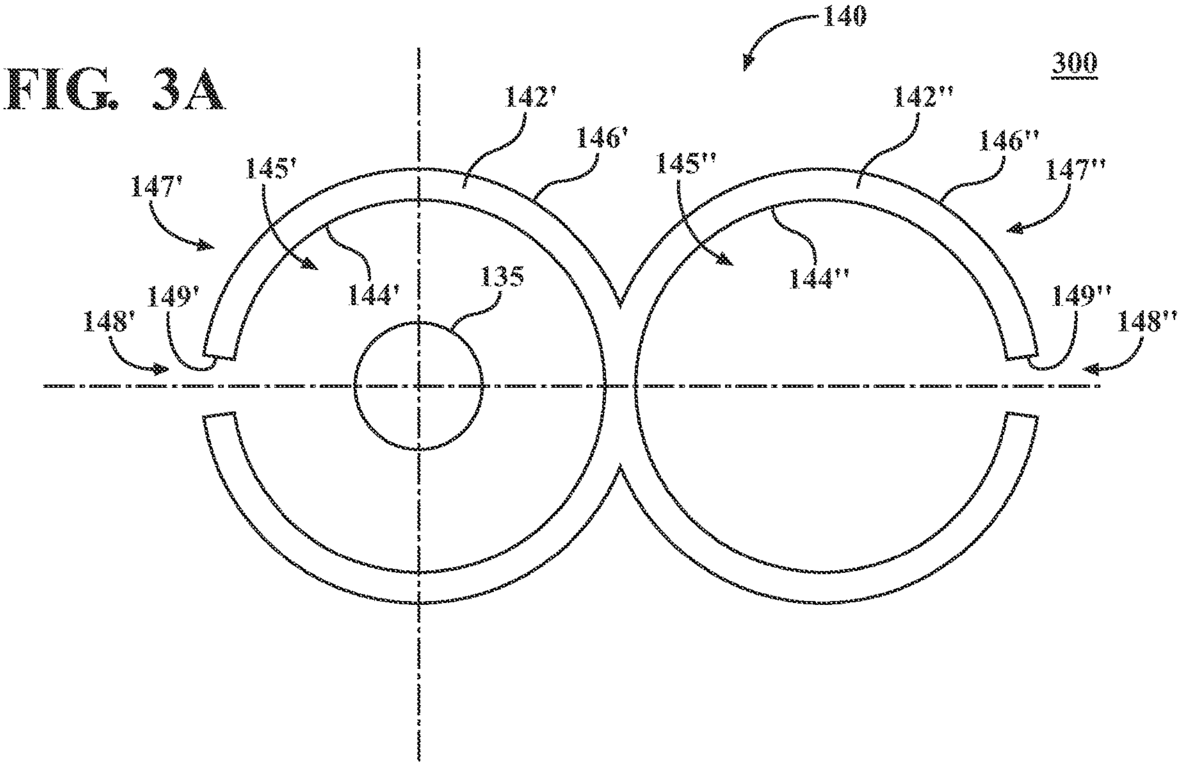
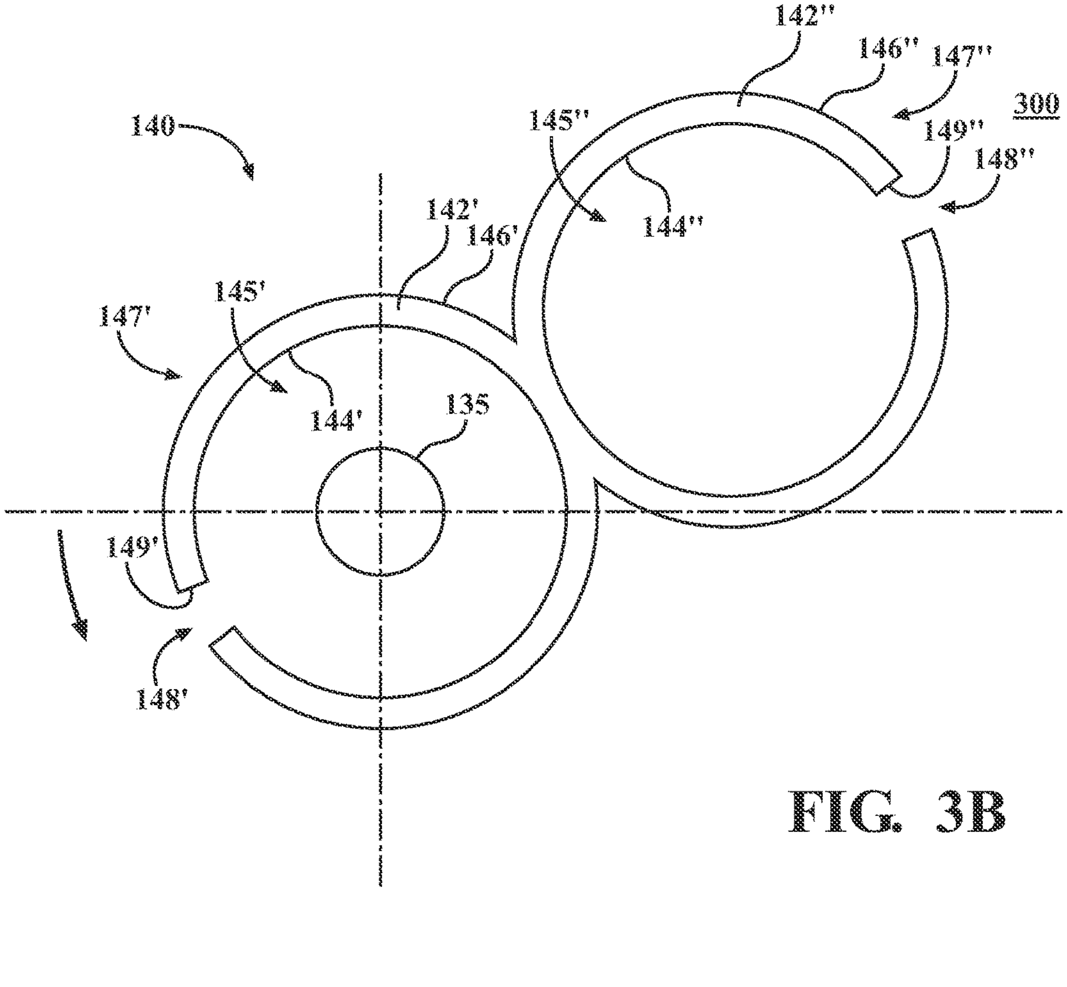
FIG. 3B

FIG. 3C
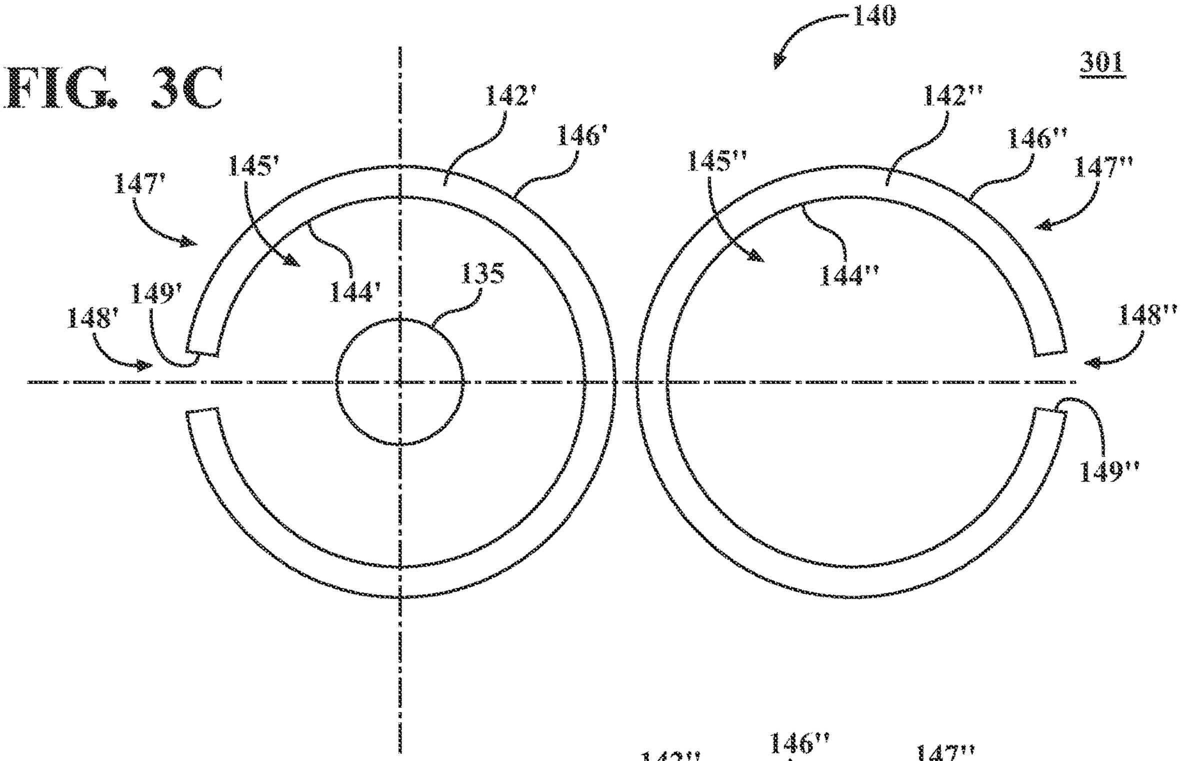
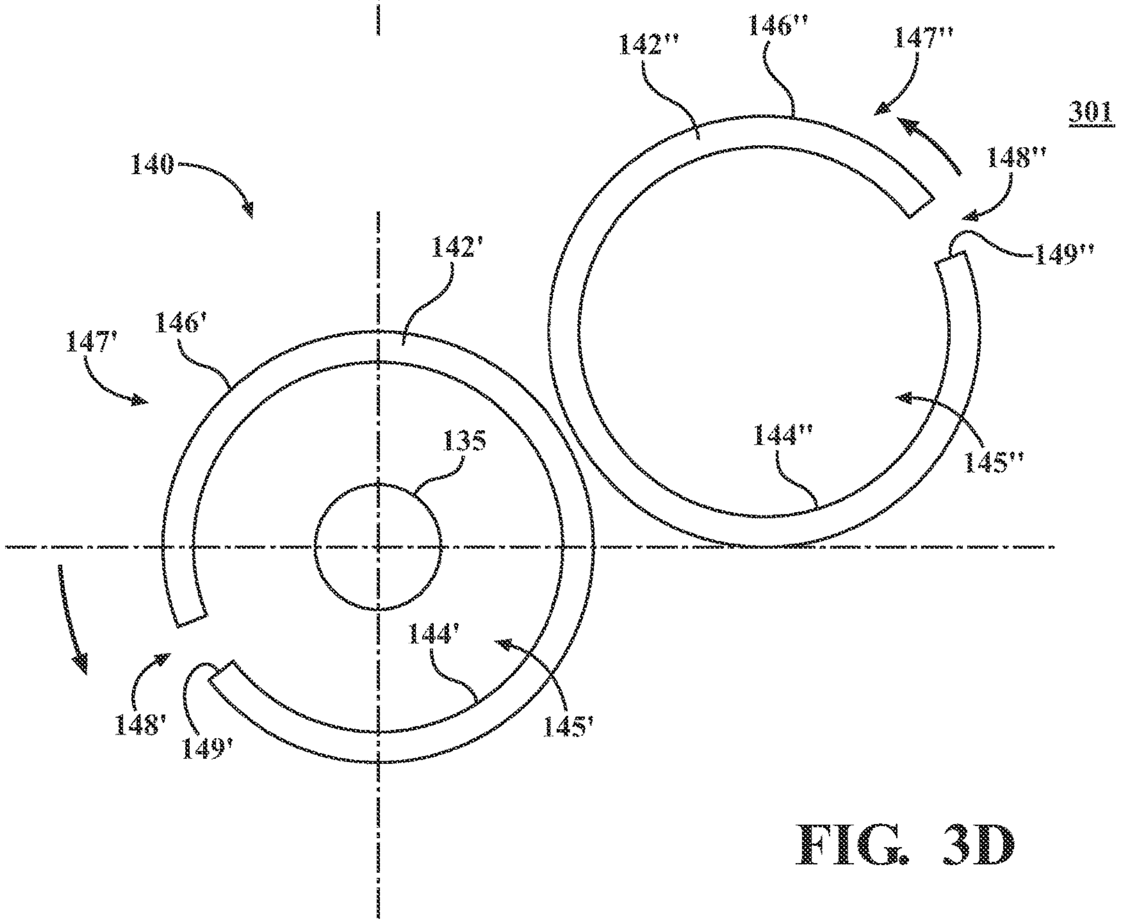
FIG. 3D

FIG. 4A
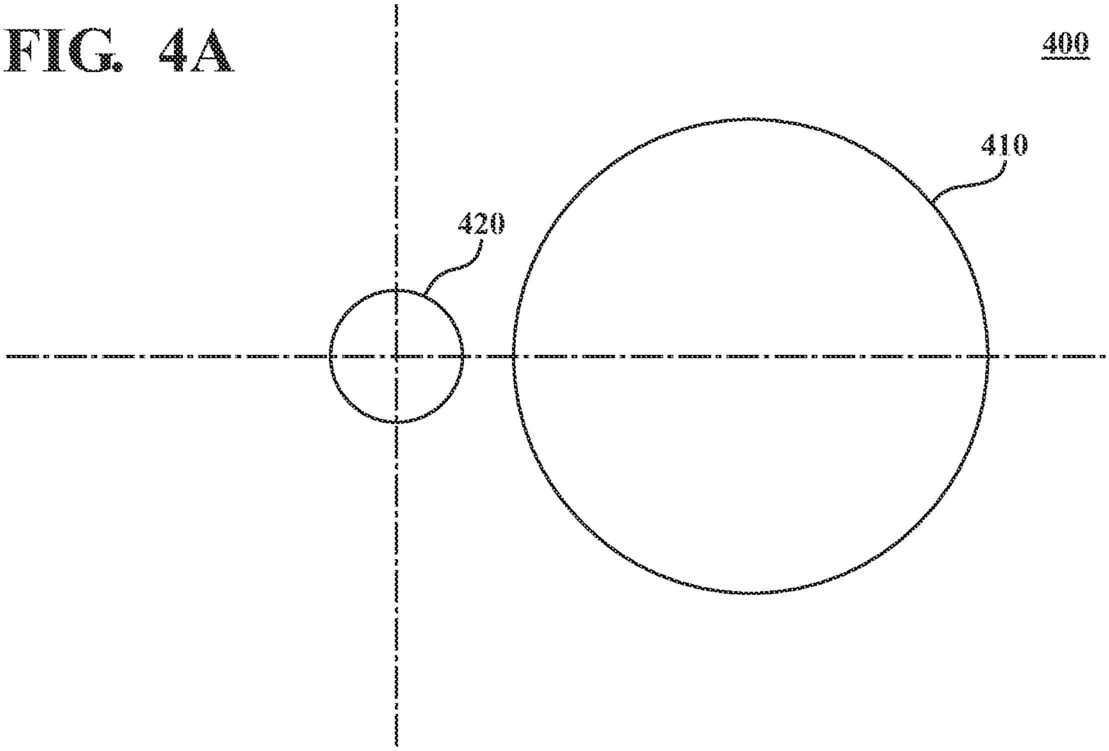
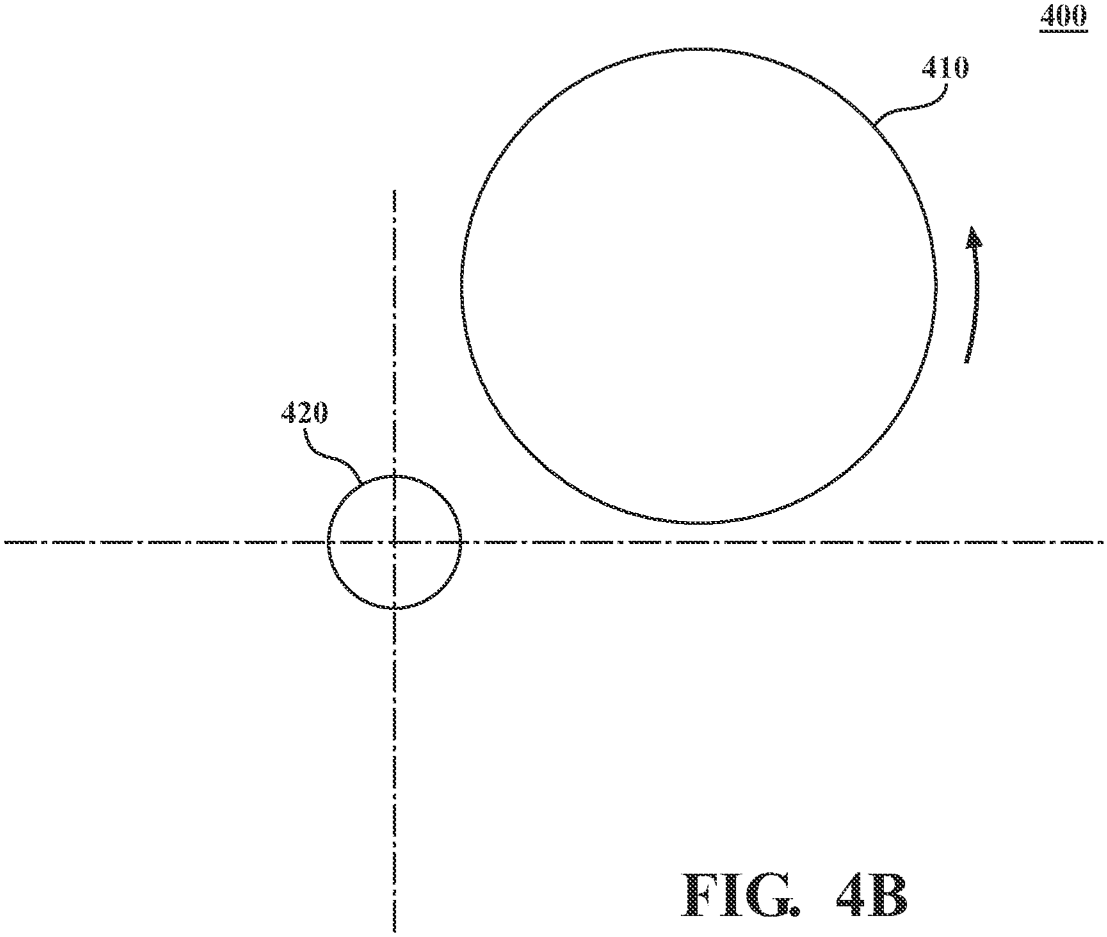
FIG. 4B

FIG. 5A
500
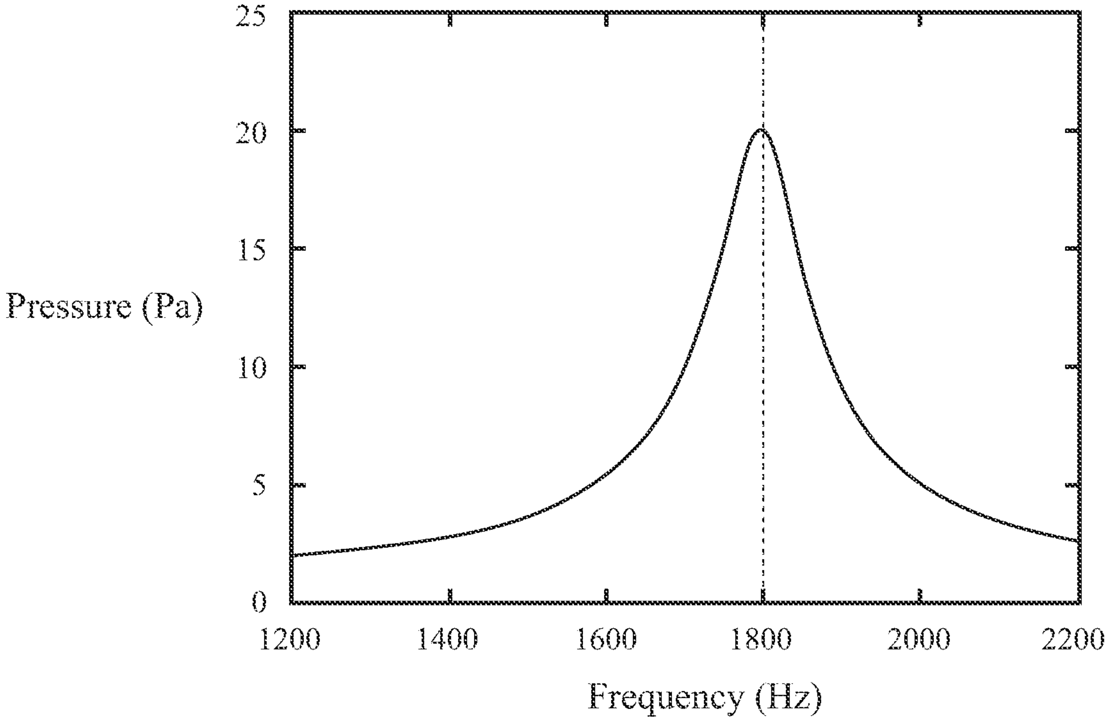
510
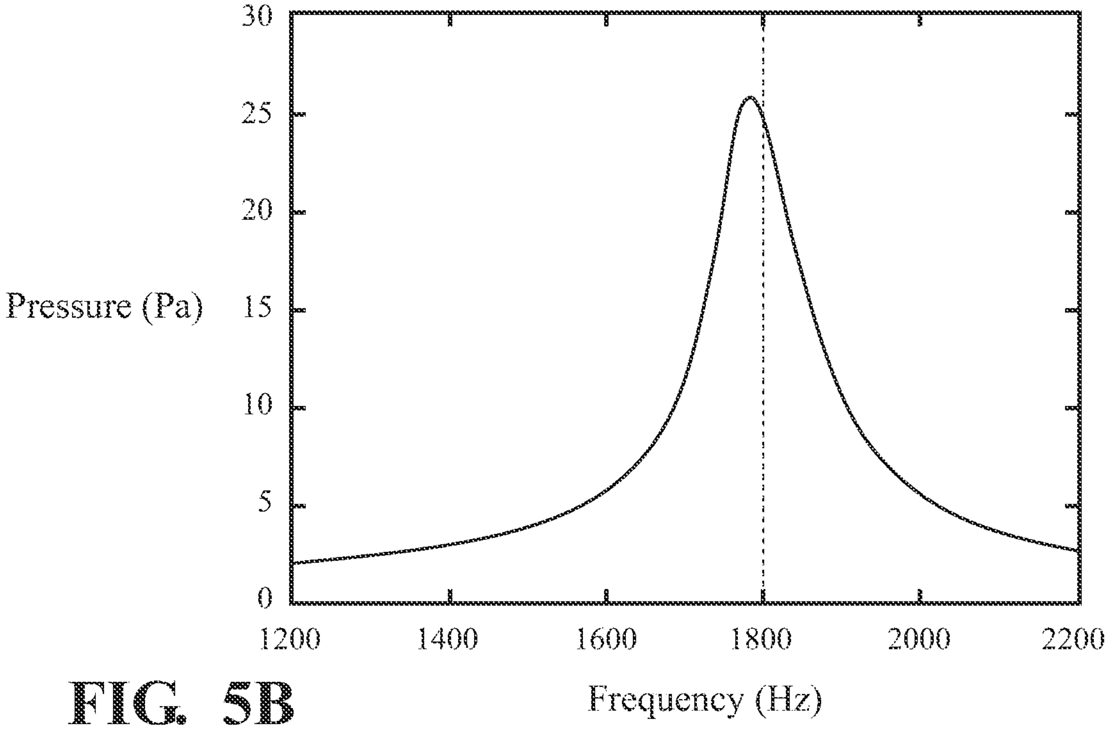
FIG. 5B

FIG. 5C
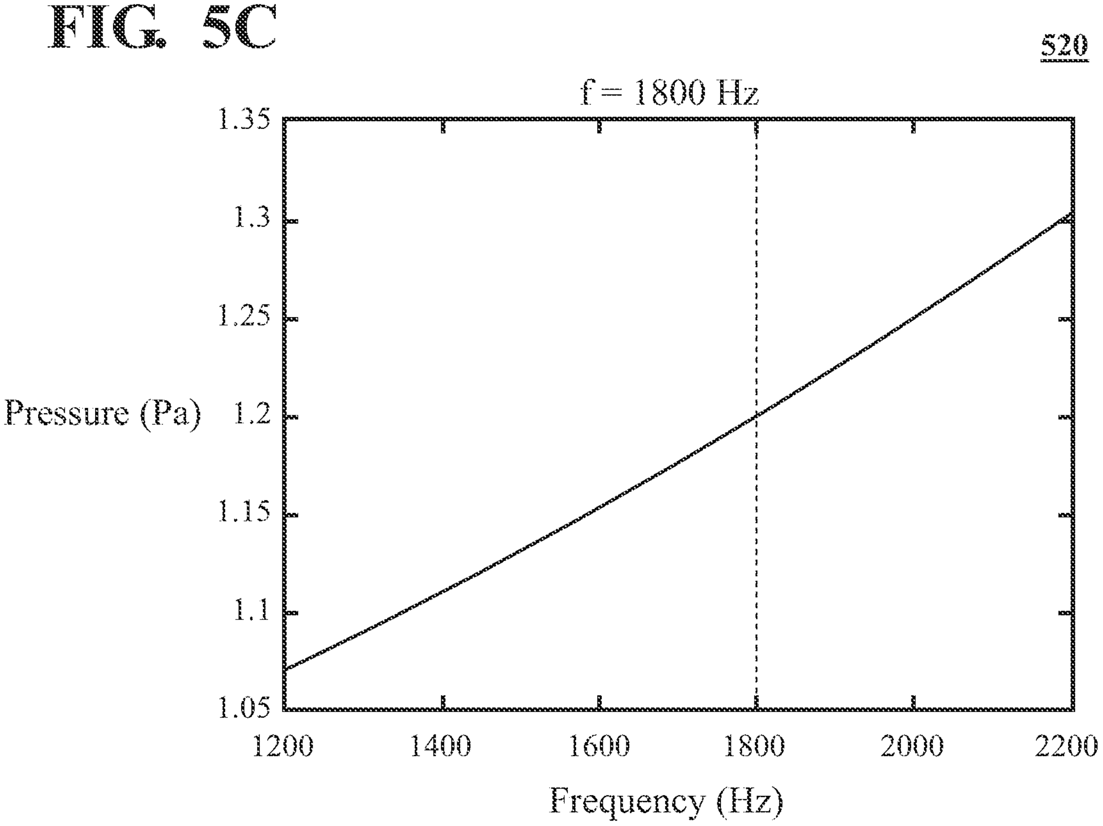
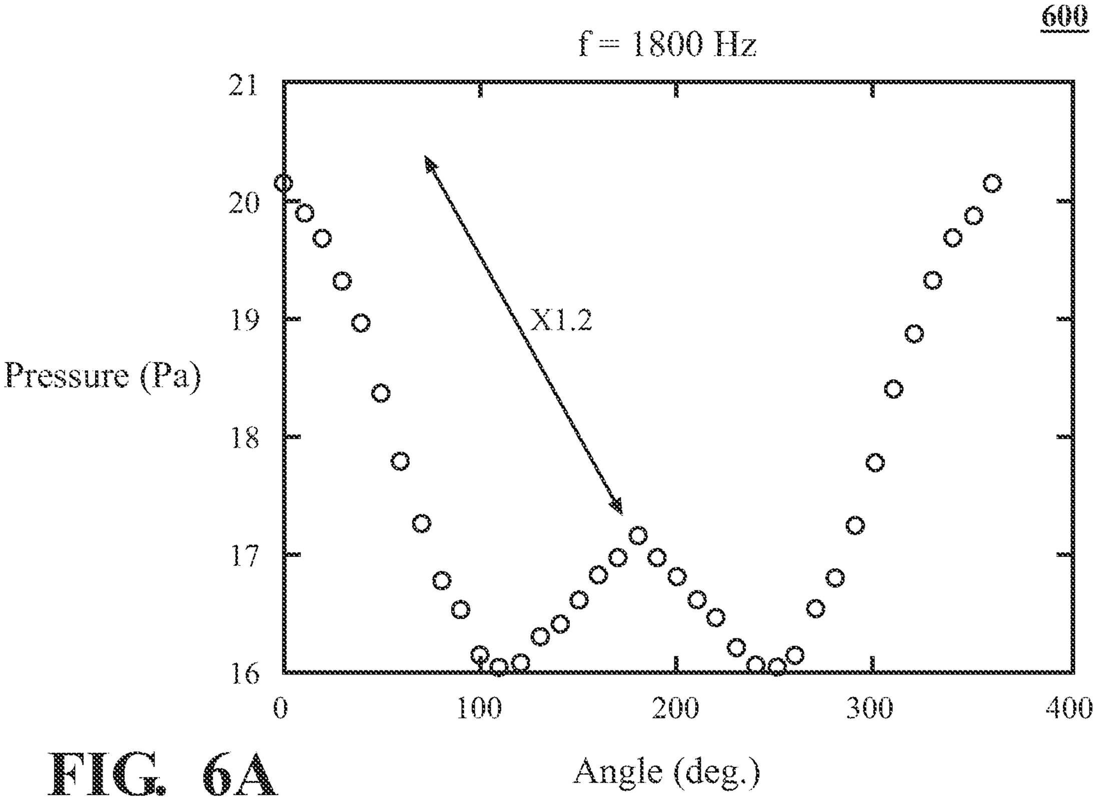
FIG. 6A

FIG. 6B
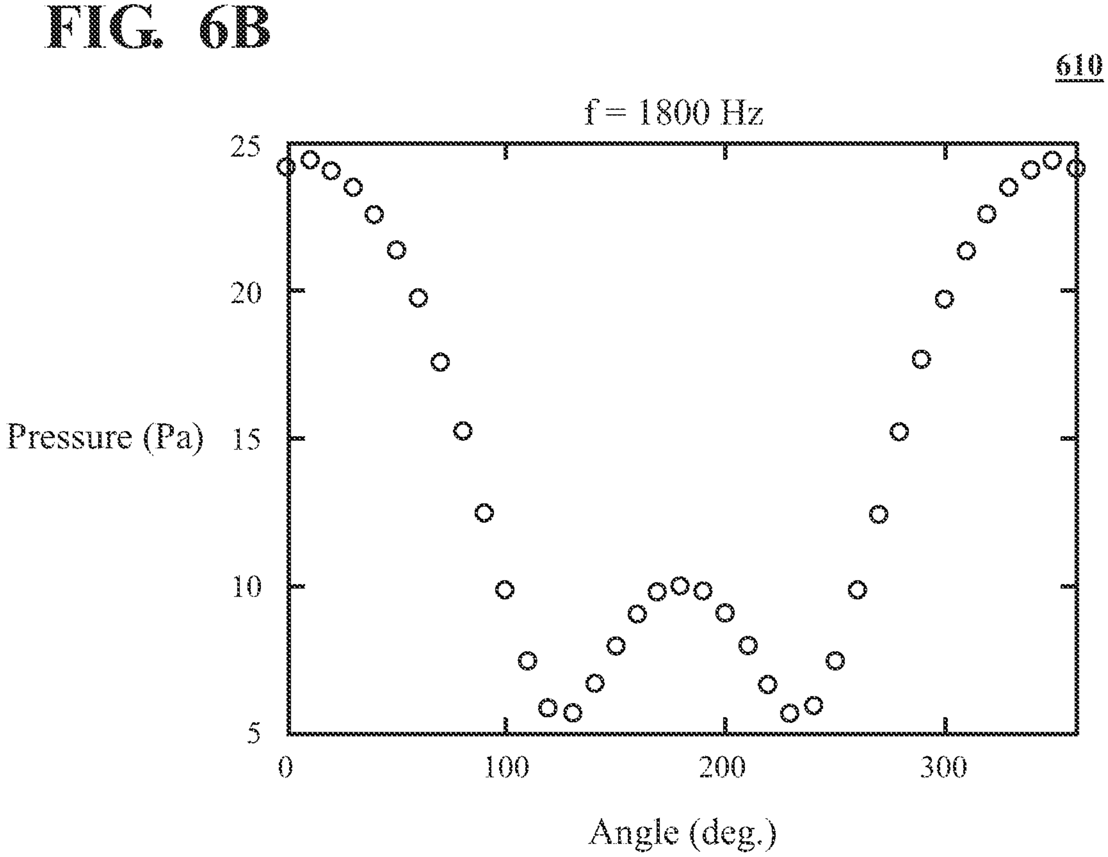
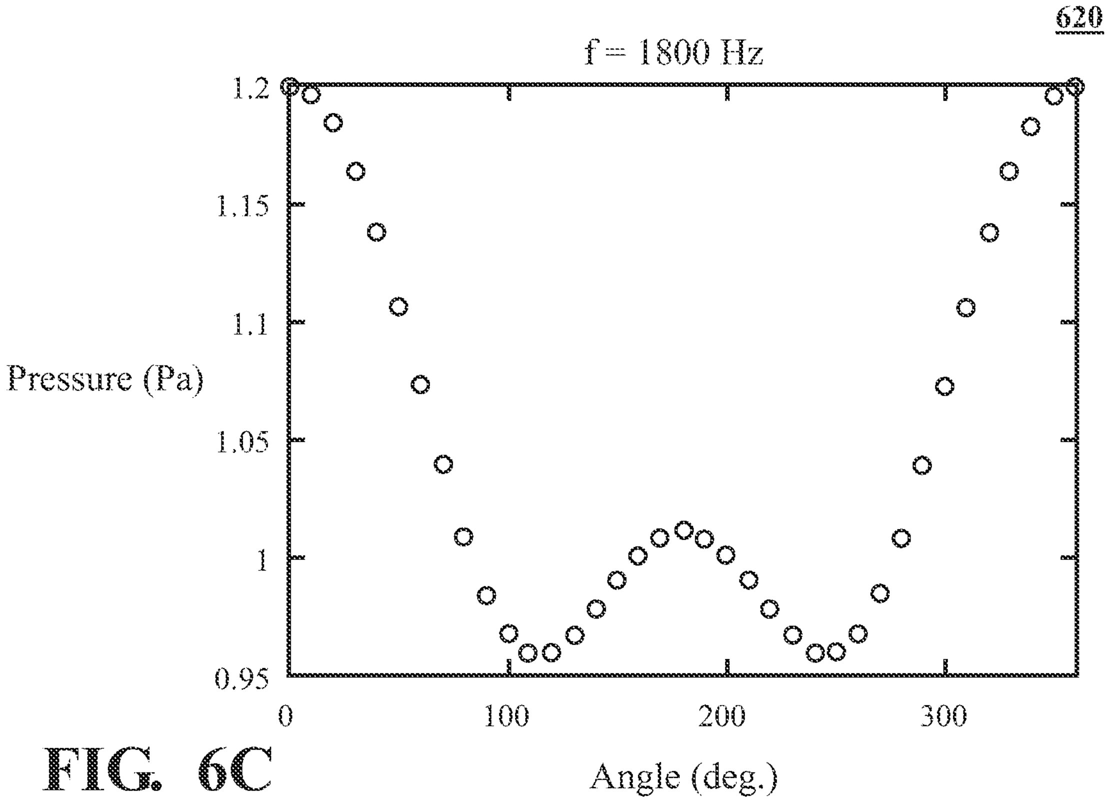
FIG. 6C

FIG. 7A
700
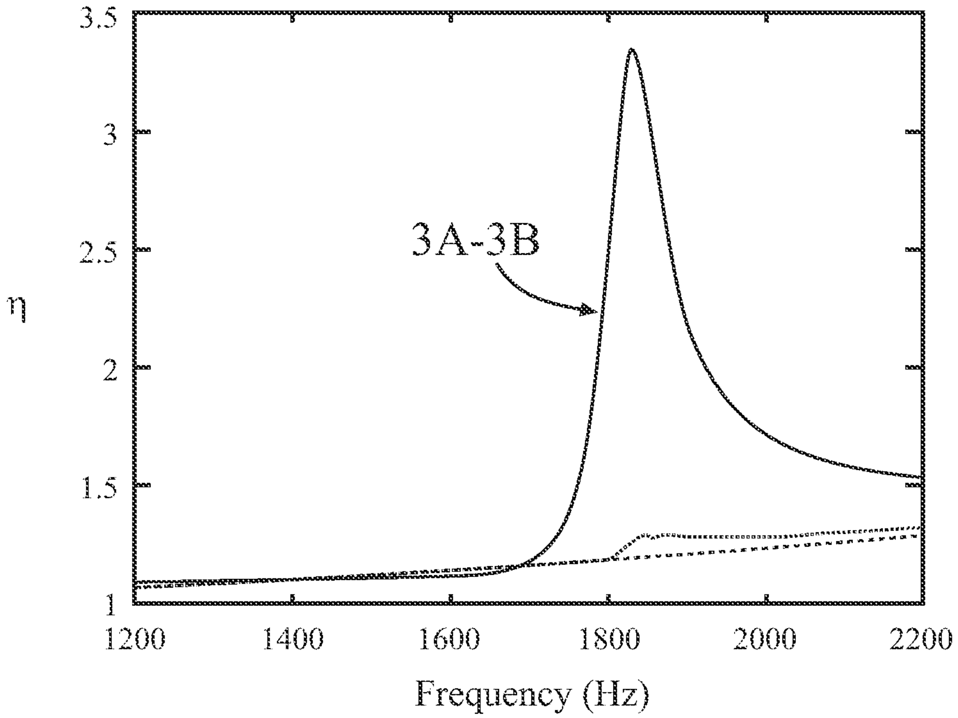
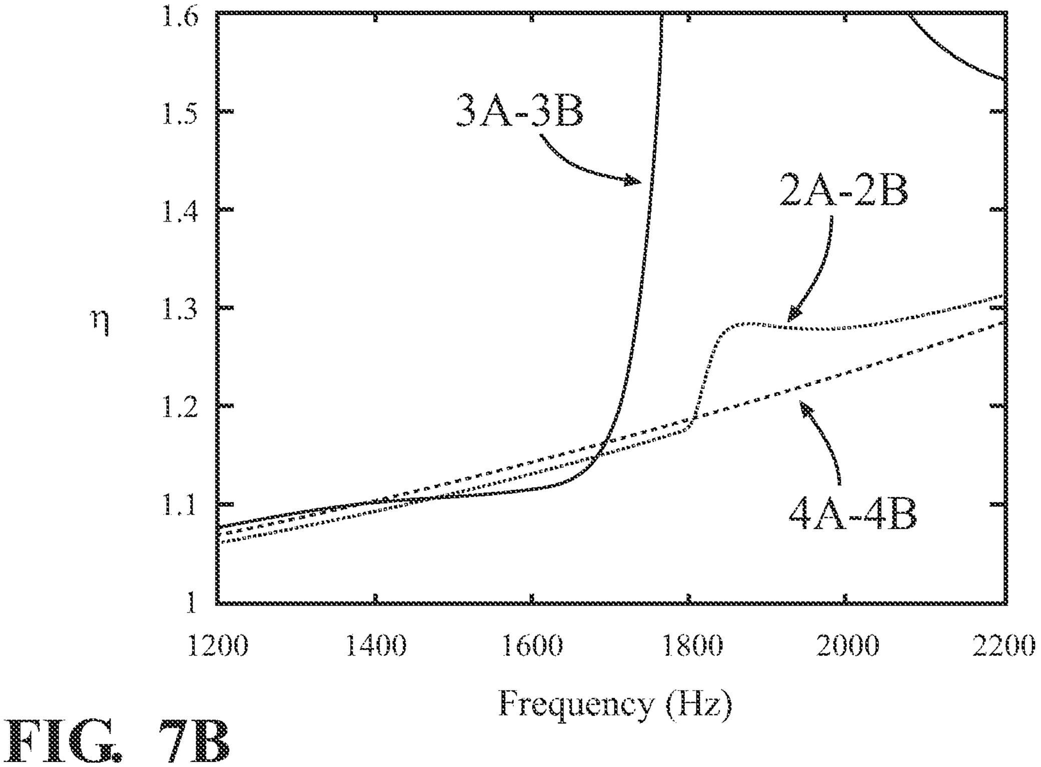
FIG. 7B

800

ACOUSTIC WAVE DIRECTION DETECTION UTILIZING A SINGLE MICROPHONE

FIELD

The subject matter described herein relates in general to acoustics and, more particularly, to determining a direction of an acoustic wave.

BACKGROUND

Sensing of the incident angle of acoustic waves is required for many applications, such as applications involving the localization of a sound source. Systems for sensing acoustic incident angle usually measure the difference in sound wave arrival time, or phase difference, at two or more spaced-apart microphones.

SUMMARY

In one respect, the present disclosure is directed to a system for detecting acoustic direction. The system includes a resonator. The resonator can include a body defining an interior. The body can include an aperture to allow communication between the interior and an exterior of the resonator. The resonator can be configured to rotate. The system includes a single microphone. The single microphone can be operatively positioned within the interior of the resonator. The single microphone can be configured to acquire sound data of an incident acoustic wave. The system can include one or more processors. The one or more processors can be operatively connected to the single microphone. The one or more processors can be configured to determine a direction of the incident acoustic wave based on the acquired sound data.

In another respect, the present disclosure is directed to a system for detecting acoustic direction. The system can include a Helmholtz resonator. The Helmholtz resonator can include a body defining an interior. The body can include a slit. The slit can allow communication between the interior and an exterior of the resonator. The system includes one or more motors operatively connected to cause the Helmholtz resonator to rotate. The system includes a single microphone. The single microphone can be operatively positioned within the interior of the Helmholtz resonator. The single microphone can be configured to acquire sound data of an incident acoustic wave. The system can include one or more processors operatively connected to the single microphone. The one or more processors can be configured to determine a direction of the incident acoustic wave based on the acquired sound data. The Helmholtz resonator can be rotated at a speed that is faster than a duration of the acoustic wave such that the single microphone acquires sound data of the incident acoustic wave at least two times.

BRIEF DESCRIPTION OF THE DRAWINGS

FIG. 2A is an example of a portion of the sound direction system, showing a cross-sectional view of one example of a single resonator arrangement.

FIG. 2B is an example of a portion of the sound direction system, showing the rotation of the single resonator arrangement of FIG. 2A.

FIG. 3A is an example of a portion of the sound direction system, showing a cross-sectional view of a first example of a double resonator arrangement.

FIG. 3B is an example of a portion of the sound direction system, showing the rotation of the double resonator arrangement of FIG. 3A.

FIG. 3C is an example of a portion of the sound direction system, showing a cross-sectional view of a second example of a double resonator arrangement.

FIG. 3D is an example of a portion of the sound direction system, showing the rotation of the double resonator arrangement of FIG. 3C.

FIG. 4A is an example of a control arrangement, showing an obstructing object and a microphone.

FIG. 4B is an example of the control arrangement, showing the rotation of the obstructing object of FIG. 4A.

FIG. 5A is an example of a pressure versus frequency graph for the single resonator arrangement of FIGS. 2A-2B.

FIG. 5B is an example of a pressure versus frequency graph for the double resonator arrangement of FIGS. 3A-3B.

FIG. 5C is an example of a pressure versus frequency graph for the control arrangement of FIGS. 4A-4B.

FIG. 6A is an example of a pressure versus angle graph for the single resonator arrangement of FIGS. 2A-2B.

FIG. 6B is an example of a pressure versus angle graph for the double resonator arrangement of FIGS. 3A-3B.

FIG. 6C is an example of a pressure versus angle graph for the control arrangement of FIGS. 4A-4B.

FIG. 7A is an example of a frequency versus amplitude graph for the single resonator arrangement of FIGS. 2A-2B, the double resonator arrangement of FIGS. 3A-3B, and the control arrangement of FIGS. 4A-4B.

FIG. 7B is a close-up view of a portion of the frequency versus amplitude graph of FIG. 7A.

DETAILED DESCRIPTION

Figure 1:
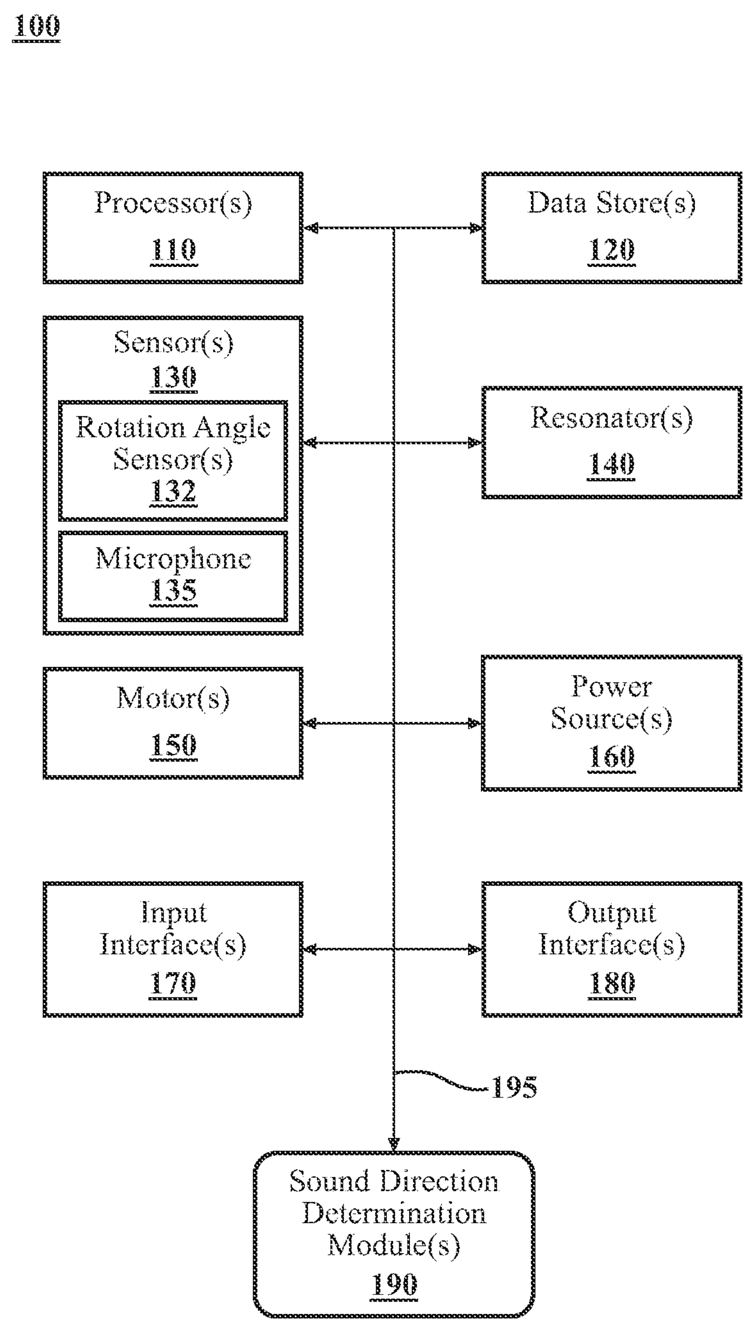
FIG. 1 is an example of a system for acoustic direction sensing utilizing a single detector.

Currently, in order to determine the direction of the source of a sound, a plurality of microphones is necessary. The microphones/sensors used in sound-direction sensing are expensive. Further, in some instances, a substantial distance between the multiple microphones is required, making it difficult to achieve a compact design. Thus, arrangements described herein are directed to detecting the direction of an incident acoustic wave using a single microphone. An acoustic wave may be referred to herein as a sound wave, an audio wave, an acoustic signal, a sound signal, or an audio signal.

The single microphone can be operatively positioned within the interior of a rotating resonator. One or more processors can be operatively connected to the single microphone and can be configured to determine a direction of the incident acoustic wave based on sound data acquired by the single microphone.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a system 100 for acoustic direction sensing utilizing a single detector is shown. The system 100 can include various elements. Some of the possible elements of the system 100 are shown in FIG. 1 and will now be described. However, it will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, the elements shown may be physically separated by large distances. Indeed, one or more of the elements can be located remote from the other elements of the system 100.

The system 100 can include one or more processors 110, one or more data stores 120, one or more sensors 130, a single microphone 135, a resonator 140, one or more motors 150, one or more power sources 160, one or more input interfaces 170, one or more output interfaces 180, and/or one or more modules (e.g., one or more sound direction determination modules 190). Each of these elements will be described in turn below.

The system 100 can include one or more processors 110. A "processor" can include any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The data store(s) 120 can store any suitable data or information in any form, now known or later developed. For instance, the data store(s) 120 can store information about any of the elements of the system 100. For instance, the data store(s) 120 can store information about the resonator 140, such as the resonance frequency of the resonator 140 and/or the rotation speed of the resonator 140. In some arrangements, the data store(s) 120 can store pressure versus angle graphs for the resonator 140. These graphs can be for one or more example sound waves. Non-limiting examples of such graphs are shown in FIGS. 6A-6B. Further, the data store(s) 120 can store information about an acoustic source, including properties of acoustic waves emitted by the acoustic source. Such properties can include a duration of the acoustic waves emitted by the acoustic source.

The system 100 can include one or more sensors 130. "Sensor" means any device, component and/or system that can detect, determine, assess, monitor, measure, quantify and/or sense something. The one or more sensors 130 can detect, determine, assess, monitor, measure, quantify and/or sense in real-time. As used herein, the term "real-time" means a level of processing responsiveness that a user, entity, component, and/or system senses as sufficiently immediate for a particular process or determination to be made, or that enables a processor to process data at substantially the same rate as some external process or faster.

In arrangements in which there are a plurality of sensors 130, the sensors 130 can work independently from each other. Alternatively, two or more of the sensors 130 can work in combination with each other. In such case, the two or more sensors 130 can form a sensor network. The sensor(s) 130 can be operatively connected to the processor(s) 110, the data store(s) 120, and/or other element of the system 100 (including any of the elements shown in FIG. 1). The sensor(s) 130 can acquire data of at least a portion of the system 100.

In some arrangements, the sensor(s) 130 can include one or more resonator sensors. The resonator sensor(s) can detect, determine, assess, monitor, measure, quantify and/or sense information about the resonator 140 itself. Examples of such data can include position, rotational angle, or rotational speed of the resonator 140. For instance, the sensor(s) 130 can include one or more rotation angle sensors 132. The rotation angle sensor(s) 132 can include any type of sensor, now known or later developed, that can determine or can acquire data that can be used to determine a rotation angle of a rotating object.

The sensor(s) 130 can include the single microphone 135. The single microphone 135 can be "single" in that it is the only microphone in the system 100 and/or it is the only microphone from which acquired sound data is used to determine a direction of an acoustic wave. The single microphone 135 can be configured to acquire sound data of an acoustic wave. The single microphone 135 can detect, determine, assess, monitor, measure, quantify and/or sense in real-time. The single microphone 135 can acquire sound data continuously, periodically, irregularly, randomly, or at any other suitable time.

The single microphone 135 can be any type of microphone, now known or later developed. In some arrangements, the single microphone 135 can be a wireless microphone. The single microphone 135 can be operatively positioned within the resonator 140.

The system 100 can include a resonator 140. The resonator 140 can be any type of resonator, now known or later developed. In one or more arrangements, the resonator 140 can be a Helmholtz resonator or an acoustic cavity resonator. The resonator 140 can have one or more resonant frequencies.

The resonator 140 can have any suitable size, shape, and/or configuration. Some examples are shown in FIGS. 2A-2D and 3A-3D. In these arrangements, it should be noted that the resonator 140 can have a body 142 that can be substantially spherical or substantially cylindrical. As a result, the body 142 can have a substantially circular cross-sectional shape, as shown. However, it will be appreciated that the resonator 140 is not limited to these shapes.

The body 142 can have an inner surface 144 defining an interior 145. The body 142 can have an outer surface 146 defining an exterior 147. An aperture 148 can be defined in the body 142. The aperture 148 can have any suitable size, shape, and/or configuration. The aperture 148 can allow communication between the interior 145 and the exterior 147 of the resonator 140.

In one or more arrangements, the aperture 148 can be a slit 149. In some arrangements, the slit 149 can be a single continuous slit. In one or more arrangements, the slit 149 can extend along a portion of the length of the body 142. For instance, when the body 142 is substantially cylindrical, the slit 149 can extend along a portion of the length of the body 142. The slit 149 can extend less than the length of the body 142.

The resonator 140 can be configured to rotate. The resonator 140 can rotate in a clockwise or counterclockwise direction. The resonator 140 can be configured so as to be rotationally symmetrical.

The body 142 can be made of any suitable material. In some arrangements, the body 142 can be made of a plastic or metal. The body 142 can be made of a rigid material.

It should be noted that certain assumptions may underlie the system 100 according to arrangements described. For instance, the system 100 can assume that the rotation of the resonator 140 is faster than the duration of the acoustic wave. In one example, the rotation of the resonator 140 can be faster than the duration of the acoustic wave such that at least two measurements of the acoustic wave can be made before the resonator 140 makes one complete revolution. As another example, the rotation of the resonator 140 can be faster than the duration of the acoustic wave such that the resonator 140 makes at least one complete revolution during the duration of the acoustic wave. In arrangements described herein, the system 100 can assume that the amplitude of the acoustic wave does not substantially vary throughout the rotation of the resonator 140.

FIGS. 2A-2B show an example of a single resonator arrangement 200. In this example, the resonator 140 can include a body 142. The single microphone 135 can be placed within the interior 145 of the resonator 140. The single microphone 135 can be positioned in any suitable location within the interior 145 of the resonator 140. For instance, the single microphone 135 can be substantially centrally located within the resonator 140. In some arrangements, the microphone can be located substantially at an axis of rotation of the resonator 140. In some arrangements, the single microphone 135 can be offset from the center of the resonator 140 and/or the axis of rotation in one or more directions.

As is shown, the resonator 140 can be configured to rotate. In this example, in going from FIG. 2A to FIG. 2B, the resonator 140 can rotate in a counterclockwise direction. It should be noted that the single microphone 135 can remain in a fixed position while the resonator 140 rotates. As such, the single microphone 135 does not rotate with the resonator 140. The single microphone 135 can be fixed in position in any suitable manner, now known or later developed. In some arrangements, the single microphone 135 can be operatively connected to the inner surface of the body of the resonator 140 in any suitable manner, such as by one or more fasteners (e.g., screws, swivels, rods, arms, pins, linkages, rollers, retainers, etc.) or in any other suitable manner, now known or later developed. In some arrangements, one or more friction reducing components (e.g., bearings) or coatings can be used to facilitate movement of the resonator 140 while keeping the single microphone 135 in a fixed position.

Figure 2C:
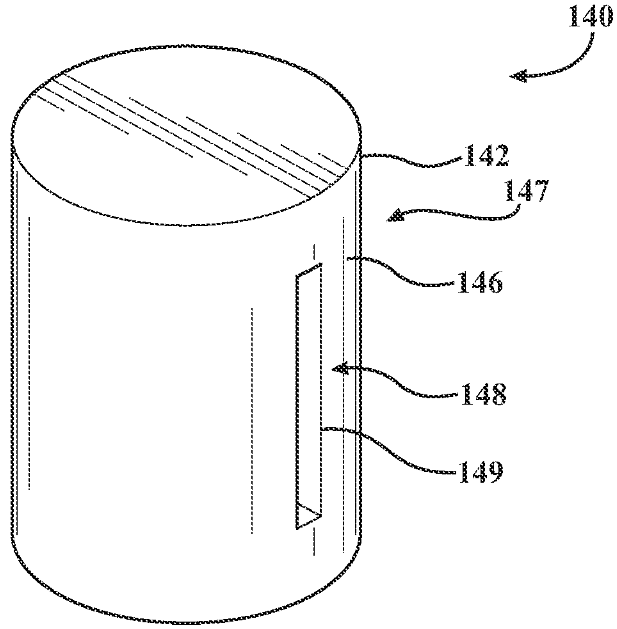
FIG. 2C is a view of the single resonator arrangement, showing a substantially cylindrical configuration.
Figure 2D:
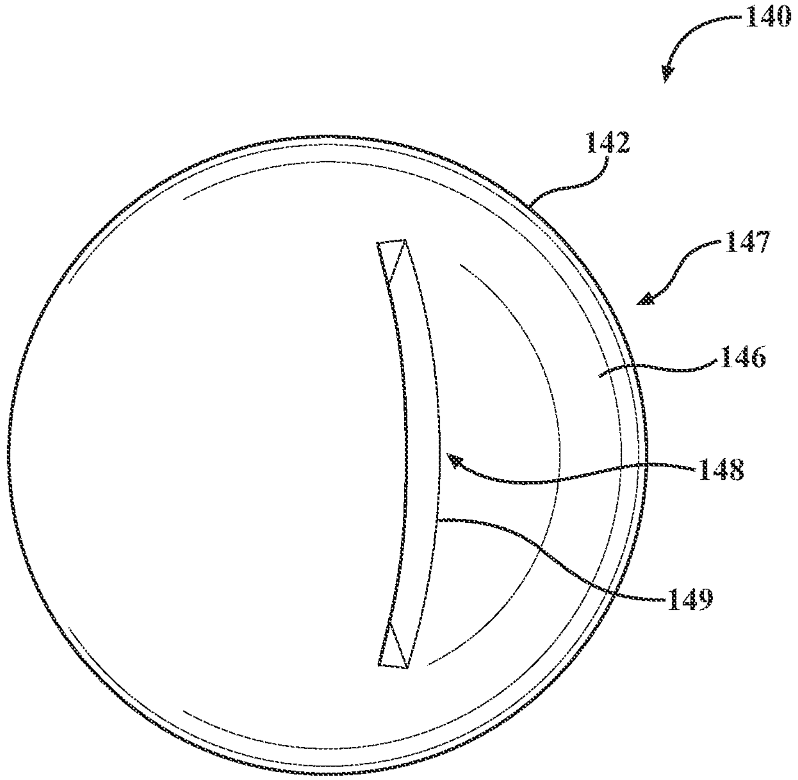
FIG. 2D is a view of the single resonator arrangement, showing a substantially spherical configuration.

As noted above, the body 142 of the resonator 140 in FIGS. 2A and 2B can have any suitable size, shape, and/or configuration. FIG. 2C shows an example of the body 142 of the resonator 140 being substantially cylindrical. FIG. 2D shows an example of the body 142 of the resonator 140 being substantially spherical.

FIGS. 3A-3D show examples of double resonator arrangements. In these arrangements, the resonator 140 can include a first body 142' and a second body 142". The first body 142' can define a first interior 145', and the second body 142" can define a second interior 145". The first body 142' can include a first aperture 148' (e.g., a first slit 149'). The first aperture 148' can allow communication between the first interior 145' and a first exterior 147' of the first body 142'. The second body 142" can include a second aperture 148" (e.g., a second slit 149"). The second aperture 148" can allow communication between the second interior 145" and a second exterior 147" of the second body 142". The single microphone 135 can be located within one of the first body 142' and the second body 142". The other one of the first body 142' and the second body 142" does not include a microphone. In the example shown, the single microphone 135 can be located within the first interior 145' of the first body 142', and the second body 142" does not house a microphone or otherwise have a microphone associated with it.

In a first double resonator arrangement 300 shown in FIGS. 3A-3B, the first body 142' can be operatively connected to the second body 142". The first body 142' can be operatively connected to the second body 142" in any suitable manner. For example, the first body 142' and the second body 142" can be formed together as a unitary structure, such as by casting, injection molding, or machining. As another example, the first body 142' and the second body 142" can be separate structures that are subsequently joined together, such as by one or more welds, one or more brazes, one or more fasteners, one or more adhesives, one or more forms of mechanical engagement, or any combination thereof, just to name a few possibilities. In this arrangement, the first body 142' and the second body 142" can rotate together, as is apparent from FIGS. 3A and 3B.

It should be noted that the first aperture 148' and the second aperture 148" can have any suitable arrangement relative to each other. For example, in one or more arrangements, the first aperture 148' can be substantially aligned with the second aperture 148", as is shown in FIGS. 3A and 3B. However, it should be noted that, in some arrangements, the first aperture 148' and the second aperture 148" can be slightly offset from each other, such as by about 10 degrees or less, about 5 degrees or less, about 4 degrees or less, about 3 degrees or less, about 2 degrees or less, or about 1 degree or less.

In a second double resonator arrangement 301 shown in FIGS. 3C-3D, the first body 142' and the second body 142" are not connected to each other. As a result, the first body 142' and the second body 142" can be rotated independently of each other. In some cases, the first body 142' and the second body 142" can be configured to be rotated simultaneously. In one or more arrangements, the first body 142' and the second body 142" can be configured to be rotated simultaneously in substantially the same direction and/or at substantially the same speed. The first body 142' and the second body 142" can have substantially the same rotational center.

It should be noted that the first aperture 148' and the second aperture 148" can have any suitable arrangement relative to each other. For example, in one or more arrangements, the first aperture 148' can be substantially aligned with the second aperture 148", as is shown in FIGS. 3A and 3B. However, it should be noted that, in some arrangements, the first aperture 148' and the second aperture 148" can be slightly offset from each other, such as by about 10 degrees or less, about 5 degrees or less, about 4 degrees or less, about 3 degrees or less, about 2 degrees or less, or about 1 degree or less. The substantial alignment of the first aperture 148' and the second aperture 148" can be maintained during rotation of the first body 142' and the second body 142".

As noted above, the body of the resonator 140 in FIGS. 3A-3D can have any suitable size, shape, and/or configuration. For instance, the first body 142' and the second body 142" can be substantially cylindrical or substantially spherical, such as the examples shown in FIGS. 2C and 2D.

Referring to FIGS. 4A-4B, an example of a control arrangement 400 is shown. The control arrangement 400 will be used as a reference point relative to the single resonator arrangement 200 shown in FIGS. 2A-2D and the first double resonator arrangement 300 shown in FIGS. 3A-3D. The control arrangement 400 can include an obstructing object 410 and a microphone 420. The microphone 420 can be in a fixed position. The obstructing object 410 can be configured to rotate about the microphone 420. The control arrangement 400 shows how the obstructing object 410 would affect the received acoustic wave.

The obstructing object 410 can have any suitable size, shape, and/or configuration. The obstructing object 410 can be solid, or it can be hollow. The obstructing object 410 can be made of any suitable material, such as metal or plastic. The obstructing object 410 is not configured as a resonator, and the control arrangement 400 is non-resonant.

The pressure versus frequency performance of the arrangements of FIGS. 2A-2D, 3A-3B, and 4A-4B are shown in FIGS. 5A-5C, respectively. Referring to FIG. 5A, an example of a pressure versus frequency graph 500 for the single resonator arrangement 200 of FIGS. 2A-2D is shown. For a given resonator with a given resonance frequency, the maxima can have a frequency dependence, as is evident in FIG. 5A. Here, the resonant frequency can be about 1800 Hz.

Referring to FIG. 5B, an example of a pressure versus frequency graph 510 for the first double resonator arrangement 300 of FIGS. 3A-3B is shown. Again, for a given resonator with a given resonance frequency, the maxima can have a frequency dependence as shown in FIG. 5B. Here, the resonant frequency can be about 1800 Hz.

In contrast, FIG. 5C shows an example of a pressure versus frequency graph for the control arrangement 400 of FIGS. 4A-4B. As is evident, there is little frequency dependence observed.

The system 100 can include one or more motors 150. The motor(s) 150 can be any type of motor, now known or later developed. The motor(s) 150 can be operatively connected to cause a rotation of the resonator 140. The motor(s) 150 can be controlled by the one or more processor(s) 110. For instance, the one or more processor(s) 110 can be configured to turn the motor(s) 150 on, off, and/or control the speed of the motor(s) 150.

The system 100 can include one or more power sources 160. The power source(s) 160 can be any power source capable of and/or configured to energize the motor(s) 150 or other component(s) of the system 100. For example, the power source(s) 160 can include one or more batteries, one or more fuel cells, one or more generators, one or more alternators, one or more solar cells, one or more capacitors, and/or combinations thereof. The processor(s) 110 can be configured to control the supply of power from the power source(s) 160 to one or more components of the system 100.

The system 100 can include one or more input interfaces 170. An "input interface" includes any device, component, system, element or arrangement or groups thereof that enable information/data to be entered into a machine. The input interface(s) 170 can receive an input from a user (e.g., a person) or other entity. Any suitable input interface(s) 170 can be used, including, for example, a keypad, display, touch screen, multi-touch screen, button, joystick, mouse, trackball, microphone, gesture recognition (radar, lidar, camera, or ultrasound-based), and/or combinations thereof.

The system 100 can include one or more output interfaces 180. An "output interface" includes any device, component, system, element or arrangement or groups thereof that enable information/data to be presented to a user (e.g., a person) or other entity. The output interface(s) 180 can present information/data to a user or other entity. The output interface(s) 180 can include a display, an earphone, a haptic device, and/or a speaker. Some components may serve as both a component of the input interface(s) 170 and a component of the output interface(s) 180.

The system 100 can include one or more modules. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions. The modules described herein can include artificial or computational intelligence elements, e.g., neural network, fuzzy logic or other machine learning algorithms. Further, the modules can be distributed among a plurality of modules.

The system 100 can include one or more sound direction determination modules 190. The sound direction determination module(s) 190 can be configured to receive sound data acquired by the single microphone 135 about an incident acoustic wave. Based on the acquired sound data, the sound direction determination module(s) 190 can be configured to determine a direction of an incident acoustic wave. The sound direction determination module(s) 190 can be configured to do so in any suitable manner.

A first example of one manner in which the sound direction determination module(s) 190 can determine a direction of an incident acoustic wave will now be described. In one or more arrangements, the single microphone 135 can be configured to acquire sound data (including pressure) at a plurality of rotation angles during a full rotation of the resonator 140. As an example, the sound data and the rotational angle data can be acquired at about 5 degree intervals during a full rotation of the resonator 140. In such case, 72 measurements can be made during a full rotation of the resonator 140. Of course, it will be appreciated that other intervals, including non-regular intervals, are possible. In some arrangements, the sound data and the rotation angle data can be acquired at the same time at each measurement point. The rotational angle data and the sound data can be associated with each other at each measurement point.

The sound direction determination module(s) 190 can be configured to identify the maximum value of the acquired sound data (e.g., the maximum pressure) acquired by the single microphone 135. From there, the sound direction determination module(s) 190 can be configured to identify the rotation angle corresponding to the maximum value of the acquired sound data. As long as the signal amplitude of the incident acoustic wave remains the same (or substantially the same) for the full rotation of the resonator 140, the rotation angle with the maximum microphone value will be the same as the sound direction.

In some arrangements, the sound direction determination module(s) 190 can be configured to use sound data acquired by the single microphone 135 to generate one or more graphs of the sound data (e.g., frequency, pressure, etc.) versus the rotation angle of the resonator 140. The acquired sound data versus rotation angle data can be plotted. A curve can be fitted to the plotted points. The rotation angle can be measured by the rotation angle sensor(s) 132, and the sound data (e.g., frequency, pressure, etc.) can be measured by the single microphone 135. From there, the sound direction determination module(s) 190 can be configured to identify the rotation angle corresponding to the maximum value of the sound data from a curve fitted to the data points. From there, the sound direction determination module(s) 190 can be configured to identify the rotation angle corresponding to the maximum value of the sound data from the graph. Again, as long as the signal amplitude of the incident acoustic wave remains the same (or substantially the same) for the full rotation of the resonator 140, the rotation angle with the maximum microphone value will be the same as the sound direction.

FIGS. 6A-6C show examples of pressure versus angle graphs 600, 610, 620 for the single resonator arrangement 200 (FIGS. 2A-2B), the first double resonator arrangement 300 (FIGS. 3A-3B), and the control arrangement 400 (FIGS. 4A-4B), respectively. Each of the pressure versus angle graphs 600, 610, 620 can be generally W-shaped. The dependence of the observed signal at different rotational values of the resonator will become apparent. For example, FIGS. 6A-6C show the dependence of the observed signal at different rotational values of the single resonator (FIGS. 2A-2B), double resonator (FIGS. 3A-3B), and control arrangement (FIGS. 4A-4B), respectively. In FIG. 6A, the maximum pressure value can correspond to a rotation angle of 0 degrees. In FIG. 6B, the maximum pressure value can correspond to a rotation angle of about 5 to about 10 degrees. In FIG. 6C, the maximum pressure value can correspond to a rotation angle of 0 degrees.

In FIG. 6A, it is shown that there is about a 1.2× increase in amplitude at 1800 Hz when the sound is coming from the same opening as the resonator 140 (0°) versus away from the resonator 140 (180°). Thus, there can be a signal contrast ratio η of about 1.2. In some arrangements, this can be used to calculate the direction of the sound wave in two dimensions based on the known location of the sensor (e.g., the single microphone 135). As can be seen, there are variations in pressure as the resonator 140 is rotated.

As shown in FIG. 6B, there is about a 2.5× increase in amplitude at 1800 Hz when the sound is coming from the same opening as the resonator 140 versus away from the resonator 140. Thus, there can be a signal contrast ratio η of about 2.5. This improvement shows that the addition of a further resonator can increase the sensitivity of this measurement. As depicted in FIG. 6C, the control arrangement 400 has a similar profile with about a 1.2× increase in amplitude at 1800 Hz when the sound is coming from the same opening as the resonator 140 versus away from the resonator 140. Thus, there can be a signal contrast ratio η of about 1.2.

The amplitude increase of the single resonator arrangement 200, the first double resonator arrangement 300, and the control arrangement 400 are shown in FIG. 7A. FIG. 7A is an example of a frequency versus amplitude graph 700 for the single resonator arrangement of FIGS. 2A-2B, the double resonator arrangement of FIGS. 3A-3B, and the control arrangement of FIGS. 4A-4B. These graphs can be generated by the sound direction determination module(s) 190. As is apparent, the double resonator arrangement of FIGS. 3A-3B has the greatest increase in resolution, especially near the resonance frequency of the resonator 140. FIG. 7B is a close-up view of a portion of the pressure versus angle graph of FIG. 7A, including at and near the resonance frequency of the resonator 140.

A second example of a manner in which the sound direction determination module(s) 190 can determine a direction of an incident acoustic wave will now be described. In one or more arrangements, the single microphone 135 can be configured to acquire sound data (e.g., pressure) (M1, M2, . . . ) at two or more rotation angles (θ1_r, θ2_r, . . . ) during at least a portion of a full rotation of the resonator 140. In some arrangements, successive measurement points can be within 10 degrees or less of each other or within 5 degrees or less of each other relative to the rotation of the resonator 140.

The measured values can be compared to a respective one of the sound characteristic versus rotation angle graphs (e.g., FIG. 6A or FIG. 6B depending on the resonator arrangement). Here, it should be noted that the graphs can be pre-generated based on empirical, simulated, and/or predictive data. In comparing the acquired sound data to the respective graph, the angles from the x axis (θ1_g, θ2_g, . . . ) of the graph can be determined using the acquired sound data (M1, M2, . . . ). The sound direction (θ_inc) can be determined by the difference of the measured rotation angle and the rotation angle on the graph (θ1_r−θ1_g).

In some arrangements, the acquired sound data can be fitted to the existing graphs. The acquired sound data can be compared to the existing graph to find where the sound data fits with the existing graph or to find where the existing graph fits the sound data. The existing graph can be adjusted based on the acquired sound data, such as by adjusting the curve upwardly or downwardly on the y-axis. Once the existing graph is adjusted, the maximum pressure value can be determined and the corresponding rotational angle can be identified. Alternatively, since the general W-shape of the graph is known, a W-shaped curve can be extrapolated from the acquired sound data. In doing so, the maximum pressure value can be determined and the corresponding rotational angle can be identified. The rotation angle with the maximum sound data value can correspond to the sound direction of the incident acoustic wave.

The various elements of the system 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the system 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 195 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential devices, elements and/or components of the system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
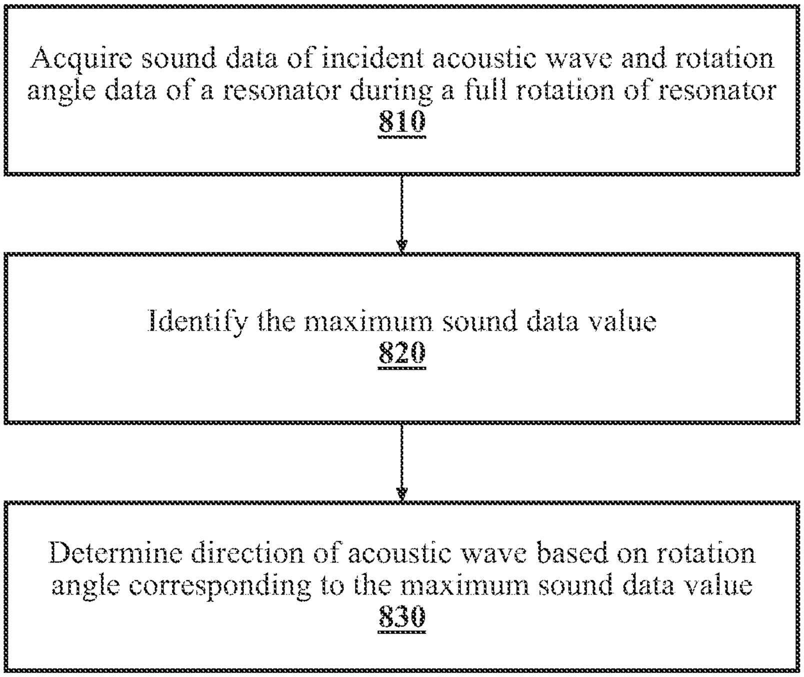
FIG. 8 is a first example of a method of determining a direction of an acoustic wave.

Turning to FIG. 8, a first example of a method 800 of determining a direction of a sound wave is shown. At block 810, sound data of an incident acoustic wave and rotation angle of the resonator 140 can be acquired at a plurality of points during a full rotation of the resonator. The sound data can be acquired by the single microphone 135, and the rotation angle of the resonator 140 can be acquired by the rotation angle sensor(s) 132. The method 800 can continue to block 820.

At block 820, the maximum value of a sound characteristic in the sound data can be identified. Such identification can be performed by the sound direction determination module(s) 190, the processor(s) 110, and/or some other module. The identification can be done by analyzing the raw sound data acquired by the single microphone 135. Alternatively, in some arrangements, a graph can be generated of the sound data (e.g., pressure) versus rotation angle. Here, the maximum value of a sound characteristic in the sound data can be identified using the generated graph. The graph can be generated by the sound direction determination module(s) 190, the processor(s) 110, and/or some other module. The method 800 can continue to block 830.

At block 830, a direction of the incident acoustic wave can be determined based on the rotation angle corresponding to the maximum sound data value. Such a determination can be performed by the sound direction determination module (s) 190, the processor(s) 110, and/or some other module. The determination can be done by analyzing the rotation angle data corresponding to the raw sound data. Alternatively, the determination can be done by analyzing the graph of the sound data versus the rotation angle.

The method 800 can end. Alternatively, the method 800 can return to block 810 or to some other block. The method 800 can be repeated at any suitable point, such as at a suitable time or upon the occurrence of any suitable event or condition.

Figure 9:
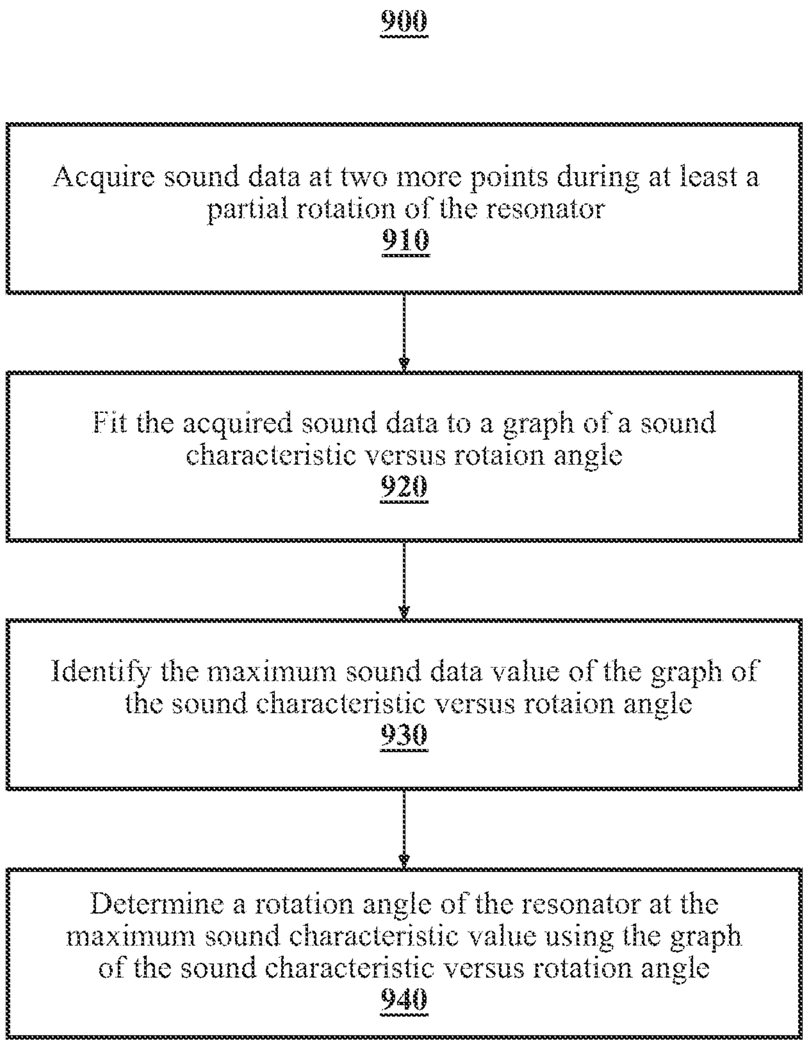
FIG. 9 is a second example of a method of determining a direction of an acoustic wave.

Turning to FIG. 9, a second example of a method 900 of determining a direction of a sound wave is shown. At block 910, sound data of an incident acoustic wave can be acquired at two or more points during at least a partial rotation of the resonator 140. The sound data can be acquired by the single microphone 135. The rotation angle of the resonator 140 can be acquired by the rotation angle sensor(s) 132. The method 900 can continue to block 920.

At block 920, the acquired sound data and rotation angle data can be fitted to a graph of a sound characteristic versus rotation angle. The graph can be stored in the data store(s) 120. The fitting can be performed by the sound direction determination module(s) 190, the processor(s) 110, and/or some other module. The fitting can include overlaying the sound data on the graph. The fitting can include determining where the sound data matches at least a portion of the graph. The fitting can include adjusting the graph based on the acquired sound data. The method 900 can continue to block 930.

At block 930, a maximum sound data value of the fitted graph of the sound characteristic versus rotation angle can be identified. The identifying can be performed by the sound direction determination module(s) 190, the processor(s) 110, and/or some other module. The method 900 can continue to block 940.

At block 940, a rotation angle of the resonator at the maximum sound characteristic value can be determined by using the fitted graph of the sound characteristic versus rotation angle. The determining can be performed by the sound direction determination module(s) 190, the processor (s) 110, and/or some other module.

The method 900 can end. Alternatively, the method 900 can return to block 910 or to some other block. The method 900 can be repeated at any suitable point, such as at a suitable time or upon the occurrence of any suitable event or condition.

It will be appreciated that arrangements described herein can provide numerous benefits, including one or more of the benefits mentioned herein. For example, arrangements described herein can provide an effective way to determine the direction of a sound using a single detector/microphone. By limiting the number of microphones/sensors, arrangements described herein can greatly decrease the cost of the sensor.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting acoustic direction, comprising:

a resonator including a body defining an interior, the body including an aperture allowing communication between the interior and an exterior of the resonator, the resonator configured to rotate;

a single microphone operatively positioned within the interior of the resonator, the single microphone being configured to acquire sound data of an incident acoustic wave; and a processor operatively connected to the single microphone and being configured to determine a direction of the incident acoustic wave based on the acquired sound data, the single microphone being the only microphone in the system and/or the only microphone from which acquired sound data is used to determine the direction of an acoustic wave.

2. The system of claim 1, wherein the resonator is rotating at a speed that is faster than a duration of the incident acoustic wave such that the single microphone acquires sound data of the incident acoustic wave at least two times during a full rotation of the resonator.

3. The system of claim 1, wherein the resonator is a single resonator.

4. The system of claim 1, wherein the single microphone is substantially centrally located within the interior of the resonator.

5. The system of claim 1, further including one or more motors operatively connected to rotate the resonator.

6. The system of claim 1, wherein the resonator is substantially cylindrical or substantially spherical.

7. The system of claim 1, wherein the single microphone is fixed in place such that it does not rotate with the resonator.

8. The system of claim 1, wherein the resonator is a Helmholtz resonator.

9. The system of claim 1, wherein determine a direction of the incident acoustic wave includes:

acquire sound data at a plurality of points during full rotation of the resonator;

identify a maximum sound data value; and determine a rotation angle of the resonator at the maximum sound data value, whereby the rotation angle with the maximum sound data value corresponds to a direction of the incident acoustic wave.

10. The system of claim 1, wherein determine a direction of the incident acoustic wave includes:

acquire sound data at two or more points during at least a partial rotation of the resonator;

fit the acquired sound data to a graph of a sound characteristic versus rotation angle; and identify the maximum sound data value of the graph of the sound characteristic versus rotation angle; and determine the rotation angle at the maximum sound characteristic value of the graph of the sound characteristic versus rotation angle, whereby the rotation angle with the maximum sound data value corresponds to a direction of the incident acoustic wave.

11. A system for detecting acoustic direction, comprising:

a double resonator including a first body defining a first interior and a second body defining a second interior, the first body including a first aperture allowing communication between the first interior and an exterior of the first body, the second body including a second aperture allowing communication between the second interior and an exterior of the second body, the double resonator being configured to rotate;

a single microphone configured to acquire sound data of an incident acoustic wave, the single microphone being located within the first interior, the second body does not include a microphone; and a processor operatively connected to the single microphone and configured to determine a direction of the incident acoustic wave based on the acquired sound data, the single microphone being the only microphone in the system and/or the only microphone from which acquired sound data is used to determine the direction of an acoustic wave.

12. The system of claim 11, wherein the first body is connected to the second body, wherein the first body and the second body rotate together.

13. The system of claim 12, wherein the first aperture is substantially aligned with the second aperture.

14. The system of claim 11, wherein the first body is not connected to the second body, wherein the first body and the second body are configured to rotate simultaneously.

15. The system of claim 14, wherein the first body and the second body rotate simultaneously in substantially the same direction and at substantially the same speed.

16. A system for detecting acoustic direction, comprising:

a Helmholtz resonator including a body defining an interior, the body defining a slit allowing communication between the interior and an exterior of the resonator;

a motor operatively connected to cause the Helmholtz resonator to rotate;

a single microphone operatively positioned within the interior of the Helmholtz resonator and configured to acquire sound data of an incident acoustic wave; and a processor operatively connected to the single microphone and configured to determine a direction of the incident acoustic wave based on the acquired sound data, the Helmholtz resonator being rotated at a speed that is faster than a duration of the acoustic wave such that the single microphone acquires sound data of the incident acoustic wave a plurality of times during a full rotation of the resonator, the single microphone being the only microphone in the system and/or the only microphone from which acquired sound data is used to determine the direction of an acoustic wave.

17. The system of claim 16, wherein the Helmholtz resonator is a single resonator.

18. A system for detecting acoustic direction, comprising:

a Helmholtz resonator being a double resonator including a first body defining a first interior and a second body defining a second interior, the first body including a first slit allowing communication between the first interior and an exterior of the first body, the second body including a second slit allowing communication between the second interior and an exterior of the second body;

a motor operatively connected to cause the Helmholtz resonator to rotate;

a single microphone located within the first interior, and the second body does not include a microphone, the single microphone being configured to acquire sound data of an incident acoustic wave; and a processor operatively connected to the single microphone and configured to determine a direction of the incident acoustic wave based on the acquired sound data, the Helmholtz resonator being rotated at a speed that is faster than a duration of the acoustic wave such that the single microphone acquires sound data of the incident acoustic wave a plurality of times during a full rotation of the resonator, the single microphone being the only microphone in the system and/or the only microphone from which acquired sound data is used to determine the direction of an acoustic wave.

19. The system of claim 18, wherein the first body is connected to the second body, wherein the first body and the second body rotate together.

20. The system of claim 18, wherein the first body is not connected to the second body, wherein the first body and the second body are configured to rotate simultaneously in substantially the same direction and at substantially the same speed.

* * * * *